United States Patent [19]
Werth et al.

[11] 4,068,104
[45] Jan. 10, 1978

[54] INTERFACE FOR IN BAND SCPC SUPERVISORY AND SIGNALLING SYSTEM

[75] Inventors: Andrew Werth, Silver Spring; Harold Lieberman, Jefferson, both of Md.

[73] Assignee: Digital Communications Corporation, Gaithersburg, Md.

[21] Appl. No.: 686,968

[22] Filed: May 14, 1976

[51] Int. Cl.² ............................................. H04B 3/46
[52] U.S. Cl. ......................... 179/175.3 R; 179/15 BZ
[58] Field of Search ................ 179/175.3 R, 175.2 C, 179/15 BF, 15 BZ, 16 E, 16 A, 16 R, 16 EC, 41 R, 18 EA

[56] References Cited

U.S. PATENT DOCUMENTS

| | | | |
|---|---|---|---|
| 3,484,557 | 12/1969 | Ruthroff | 179/41 A |
| 3,912,875 | 10/1975 | Katz | 179/41 A |
| 3,946,315 | 3/1976 | Tustison | 179/41 A |
| 3,986,120 | 10/1976 | Edström et al. | 179/15 BZ |

*Primary Examiner*—Douglas W. Olms
*Attorney, Agent, or Firm*—Pollock, Vande Sande & Priddy

[57] ABSTRACT

An in band single channel per carrier supervisory and signalling apparatus and method is disclosed for satellite communications. The apparatus includes a near supervisory interface located at a transmitting terminal, and a far supervisory interface located at a receiving terminal. The near supervisory interface responds to either dc or single tone conventional signalling on a sending telephone line and formats hook status and dial pulse transitions for in band transmission. The far supervisory interface responds to the messages, as formatted by the near supervisory interface and, re-formats the information thus communicated for the receiving telephone system.

23 Claims, 9 Drawing Figures

FIG. 6.
NEAR Supervisory Interface 10'

FIG. 7.
Generator 76

FIG. 8.
FAR End Supervisory Interface 15'

INTERFACE FOR IN BAND SCPC SUPERVISORY AND SIGNALLING SYSTEM

FIELD OF THE INVENTION

The present invention relates to supervisory and signaling interfaces for transmitting signaling and supervisory information over single channel per carrier satellite communication links.

BACKGROUND OF THE INVENTION

One of the major uses of satellite communication systems that are now in operation is the completion of telephone circuits between geographically remote locations.

These conventional terrestrial telephone circuits usually carry supervisory information indicating the status of the circuit. This supervisory signal often is in the form of a DC voltage level or a single frequency tone. When the circuit is idle, a level or frequency tone is placed on the line. Signaling is then accomplished by interrupting the DC path or pulsing the tone frequency, respectively. Signaling is employed to indicate the status of the telephone receiver by, for instance, detecting the condition of the hook switch. Thus, if the receiver is "on hook" a DC level is placed on the line to indicate an idle line. When the receiver goes "off hook" the line may be grounded. Similarly, dial pulsing is reflected by pulsing the condition of the line, with one pulse transmitted for each respective dial position. Thus, for instance, when one dials the number 7, 7 pulses may be transmitted on the line representative of that dialing action.

Known satellite communication systems which are today employed for completing telephone circuits separate the telephone signaling and supervisory information from the information which the subscriber transmits by speaking into the telephone hand set. Thus, for instance, at any terminal transmitting to a satellite, a channel is completed for each different active subscriber, for the information being transmitted by the subscriber, and a common channel is employed for supervisory and signaling information. In those communication systems which employ demand assignment features, the signaling channel is required, if only for the purposes of effecting demand assignment. There are, however, systems which do not perform demand assignment, i.e., dedicated channels. These channels obviously do not require a signaling channel for demand assignment functions, and therefore this channel carries only supervisory and other signaling information. Based on the amount and type of traffic carried by a particular transmitting terminal, the use of this channel for supervisory and signaling information may or may not be an efficient use of channel capacity. Thus, there has been a desire for satellite communication systems which employs so-called "in-band" supervisory and signaling functions. Such systems are characterized by assigning a channel to each active subscriber for not only transmitting the subscriber originated information, such as the audio portion of a telephone message, but for transmitting supervisory and signaling information as well.

It should be apparent to those skilled in the art that in any satellite communication system, one limiting parameter on the capacity of the system is the transmitting power available at the satellite. It should also be apparent that for single channel per carrier systems, it is wasteful of this limited satellite power to transmit line status in a continuous manner. To eliminate this requirement, and still provide the inband supervisory and signaling information transmitting capability, interfacing equipment is required to detect the condition of the telephone line and format a non-continuous message containing information as to the status of the telephone line for transmission. At the receiving terminal, a complimentary interface is required to detect the information contained in the supervisory and signaling messages formatted by the transmitting interface and to convert that information to a form which is capable of being employed by the receiving conventional terrestrial telephone system.

Satellite communication systems, in linking geographically widely separated telephone systems, perform a highly desirable function. However, this very function may well introduce additional complexities. Thus, for instance, the linking of a telephone system in one country with the telephone system in a second country can introduce problems when the terrestrial signaling systems in the two countries are not compatible. For instance, if the transmitting country maintains a highly sophisticated and relatively fast system in which dial pulse information is sent at a rapid rate, a problem may be introduced if the telephone system in the receiving country cannot accept dial pulse information at the rapid transmitting rate. To remedy this compatibility problems, some means must be provided to "slow down" the rapid transmission of information so that it can be effectively received by the receiving telephone system.

Moreover, since there are many different telephone systems to be interconnected by satellite communication systems, this may call for a different dial pulse rate translation, for example, for each different pair of telephone systems. Obviously, it is inefficient to design and build a different dial pulse rate translation equipment for each possible different pair of telephone systems which are to be interconnected. Rather, it would be highly desirable to design, develop and manufacture a single such dial pulse rate translation equipment which could simply be adjusted for providing the necessary translation between almost any different pair of telephone systems which are capable of being interconnected.

It is therefore one object of the present invention to provide interfacing equipment to accept supervisory and signaling information from a telephone system, format that received information into messages for effective satellite transmission, receive the transmitted messages and re-format the information so transmitted into a form for effective reception by a different telephone system. It is another object of the present invention to provide the foregoing functions which eliminate the necessity for transmitting DC levels or continuous tones which transmissions are either wasteful of limited satellite power trnsmitting capacity or are not physically realizable. It is another object of the invention to provide an interface for transmitting information on line availability in a non-continuous fashion.

It is another object of the present invention to provide such interfacing equipment which, at the same time, is capable of translating the rate at which signaling information is communicated. It is still another object of the present invention to provide the aforementioned interfacing equipment which is capable of providing differing signaling pulse rate translations as determined by the particular application.

These and other objects of the invention are fulfilled by the interfacing equipment of this invention.

SUMMARY OF THE INVENTION

The present invention includes a detecting means for producing distinct signals indicative of line status. A timer expires after a first period of on-hook status producing a timing signal. This clocks into a memory data definitive of line status. The memory drives a SOM generator to periodically format a message, for transmission, indicative of line status. At the completion of the message the memory is clocked to advance any new data for similar treatment. At the receiving terminal the periodic receipt of such messages maintains an alarm in its de-energized state. When the line goes off-hook a pulse generator responds to produce a substitute timing signal for clocking the new line status into the memory. Similar operation occurs although, in this condition the message transmitted is definitive of off-hook status. Dial digit transitions are transmitted in similar fashion. In this mode, however, a delay interposed between the SOM generator and memory limits the rate at which dial digit transitions are transmitted. The receiving terminal responds to dial digit transitions and operates a grounding contact connected to a receiving telephone system.

In a modified form of the invention all dial digit transitions corresponding to a single dialed digit are sent in binary code.

BRIEF DESCRIPTION OF THE DRAWINGS

Preferred embodiments of the invention will now be described in conjunction with the drawings appended hereto, in which like reference characters identify identical apparatus and, in which.

DETAILED DESCRIPTION OF PREFERRED EMBODIMENTS

Figure 1:
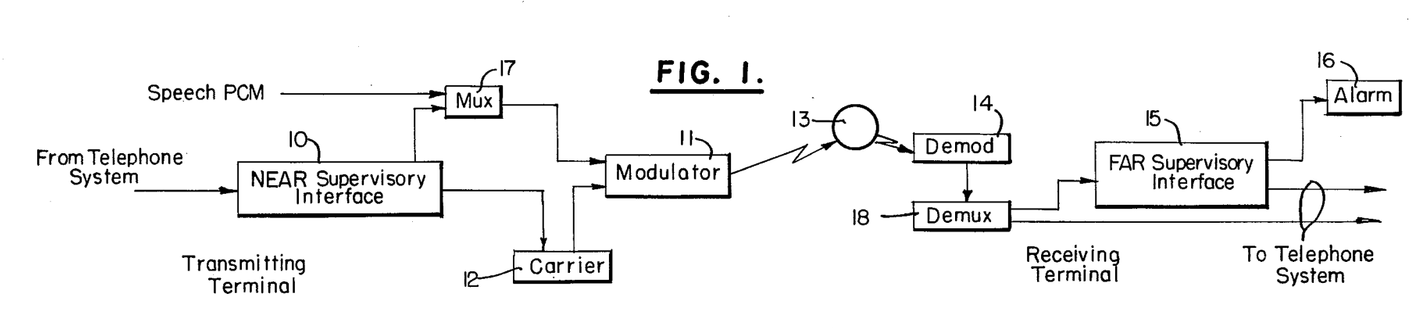
FIG. 1 is a block diagram showing the apparatus of the invention cooperating with conventional telephone systems.

FIG. 1 illustrates the setting in which the inventive interfacing aparatus and method of this invention is employed. As is illustrated in FIG. 1 a transmitting terminal includes near supervisory interface 10 responsive to a conventional terrestrial telelphone circuit. The near supervisory interface unit 10 outputs information to a multiplexer 17 and controls application of a carrier to a modulator 11 by turning on and off the carrier generator 12. The information received from the telephone system (such as an audio message) is converted, by apparatus not illustrated, to PCM form and also applied to multiplexer 17. The multiplexer output is provided to modulator 11. The output of the modulator is transmitted to a satellite relay 13. The satellite relay 13 in turn transmits a replica of the received signal to the receiving terminal, and particularly to the demodulator 14. The demodulator 14 provides an output to the far supervisory interface 15 through demultiplexer 18, at the receiving terminal. The output of the far supervisory interface is made available to the conventional terrestrial telephone circuits at the receiving terminal and also controls an alarm 16.

In operation, the near supervisory interface 10 is responsive to supervisory signals transmitted over the conventional terrestrial telephone circuit. These signals may either be a DC level or a continuous frequency tone to indicate the idle state of a telephone circuit. When a subscriber becomes active and siezes a telephone line this is indicated by a supervisory signal, for instance the line may be grounded, and when the subscriber begins dialing, the line is now pulsed with DC (or tone frequency) energy at a rate determined by the telephone system, where the number of pulses indicate the digit dialed. The near supervisory interface 10 is responsive to both the supervisory signaling as well as the dial pulsing and formats the information transmitted in that form for efficient and effective transmission over the satellite communication link. In response to the supervisory signal indicating an idle line, the near supervisory interface 10 formats periodic messages representative of the idle state of the line. The interface also turns on the carrier generator 12 and outputs the message to the modulator 11 through multiplexer 17, for transmission to the satellite relay 13. In this fashion, the transmission of the DC level or continuous tones is avoided. The near supervisory interface 10 is also responsive to dial pulses and may, in response to each transition, representing one half of a dial pulse, format a different message for similar transmission over the satellite link 13. Alternatively, the near supervisory interface 10 may respond to a number of dial pulse transitions equal to a single dialed digit, and send only a single message representative of that dialed digit in a similar fashion. Regardless of whether or not the near supervisory interface 10 transmits a different message for each dial pulse transition, or a single message representative of a single dialed digit, the near supervisory interface 10 controls the rate at which this information is transmitted. By this means, the dial pulse rate may be slowed down so that the receiving system is capable of properly responding to this information. At the completion of the dialing process, the active subscriber may begin transmitting audio information, other analog forms of information or digital information. This information is then transmitted, after conversion to PCM form (if necessary), through multiplexer 17 to the same modulator 11 via the same carrier 12 through the satellite relay 13 to the receiving terminal. This operation is representative of the in-band nature since the supervisory and signalling information is transmitted over the identical channel as is the subscriber information which follows.

At the receiving terminal, after demodulation by demodulator 14, the supervisory or signaling information is made available to the far supervisory interface 15 through demultiplexer 18. At the far supervisory interface, the periodic transmissions from the transmitting terminal, indicative of an idle telephone line, when properly decoded serve to maintain the alarm 16 in its de-energized condition. If, however, the periodic messages are not properly received, the alarm 16 is energized to indicate the failure in the communication link. When dial pulse information is received, it is properly detected and reformatted for use at the receiving telephone system.

As is indicated in FIG. 1 the transmitting telephone system and receiving telephone sysem are conventional terrestrial systems although they need not be identical. In fact, since satellite communication links are employed to link geographically widely separated points, in the ordinary course of events the two telephone systems may well have different characteristics. The carrier generator 12, modulator 11, multiplexer 17, demultiplexer 18, and demodulator 14 are representative of apparatus well known to those skilled in the art. As a result, a detailed description of this apparatus will not be given here. Rather, this description will be limited to the near supervisory interface 10, the far supervisory interface 15 and the manner in which this equipment cooperates with the modulator 11, carrier generator 12, demodulator 14, alarm 16, and the two telephone systems involved.

The preceding discussion referred to a dc level defining on hook status and ground representing off hook status. Those skilled in the art understand that this is exemplary only and many other signal combinations can and are being used to indicate line status.

Figures 2, 5A, 5B:
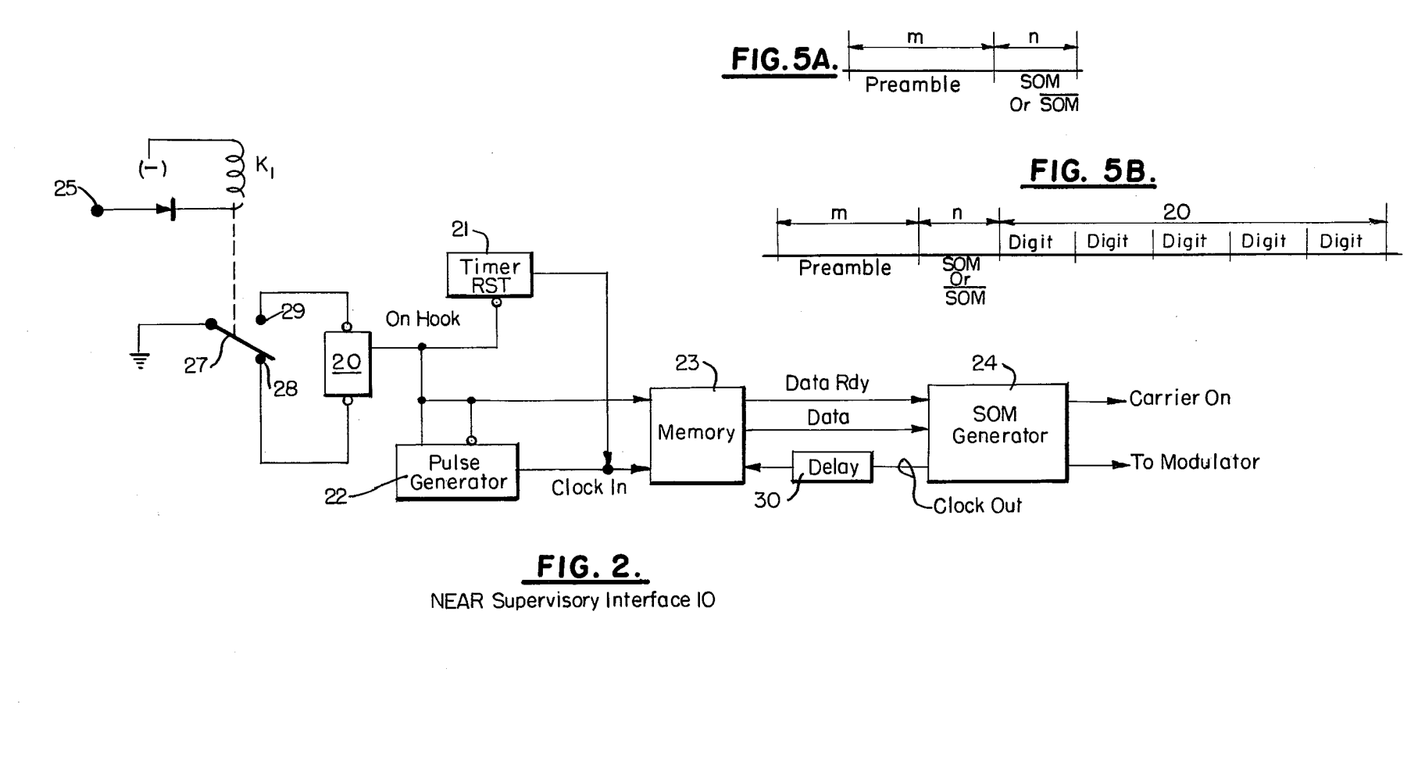
FIG. 2 is a block diagram of a near supervisory interface.
FIGS. 5A and 5B illustrate the format of meassages in two embodiments of the inventive apparatus.

FIG. 2 illustrates, in part schematic and part block diagram form, the near supervisory interface 10. This apparatus includes a near lead terminal 25 which is connected to the conventional terrestrial telephone system at the transmitting terminal. Also connected to terminal 25 is the anode of a diode 26 whose cathode is connected to one terminal of a relay coil K1. The other terminal of the relay coil K1 may be connected to a negative dc supply. Relay coil K1 controls the position of relay contact 27 which itself is grounded. Relay contact 27 may, depending upon the current carried by the coil K1, contact normally closed terminal 28 or a normally opened terminal 29. Terminals 28 and 29 are connected, respectively, to set and reset inputs of a flipflop 20. The Q output of this flipflop (ON HOOK) is connected to the reset input of a timer 21 and to the input of a pulse generator 22. In addition, the Q output is connected as one input of a first in-first out memory 23. The clocking input to memory 23 is provided by either the output of pulse generator 22 or timer 21. Memory 23 provides two outputs, a data ready output and data output to a start of message (SOM) generator 24. SOM genrator 24 provides a "clock out" output to a delay 30. The output of delay 30 is provided to memory 23. SOM generator 24 also produces a carrier on signal as an output, as well as a pulse train which is provided to modulator 11 through multiplexer 17 (see FIG,. 1). As should be apparent, with reference to FIGS, 1 and 2, the conventional terrestrial telephone system is connected to terminal 25, the carrier generator 12 is energized by the carrier on output of SOM generator 24, and the input to modulator 11 as provided by another output of SOM generator 24.

When the telephone line is in its idle state, lead 25 is grounded, and contact 27, as a result, closes normally closed contact 29 providing a high output of flipflop 20 indicating that the line is idle, i.e., the receiver is "on hook" . This allows timer 21 to free run periodically producing a clock in pulse to the memory 23. The high output of flipflop 20 is thus periodically clocked into memory 23 as a result of the output of timer 21. Memory 23 is a first in-first out memory, that is data is read out in the same temporal sequence as it is read in. Memory 23 provides two outputs, a data ready output as well as a data output. The data ready output signifies that data has propagated to the memory output and is available for reading. The SOM generator 24 will be described in more detail with reference to FIG. 3. It is sufficient here to note that on the occurrence of a data ready signal SOM generator 24 reads the data from the memory, turns on the carrier and outputs a pulse train to the modulator 11 representative of the data read out. Simultaneously SOM generator 24 produces a clock out signal which, after traversing delay 30 advances the data in memory 23 so that a new data item or word is available to the SOM generator 24. It should be apparent to those skilled in the art that the duration of delay introduced by delay 30 controls the rate at which data can be read out of memory 23. Likewise, the period of timer 21 controls the rate at which data indicative of line status is read into the memory 23. When the line status condition changes, from idle to busy, flipflop 20 changes state producing a transition at the Q output. The pulse generator 22 responds to this transition to produce a clocking pulse to allow the new status of a line to be clocked into memory 23 for later read out and transmission. In view of the foregoing it is believed that further discussion of the construction of flipflop 20, timer 21, pulse generator 22, memory 23 and delay 30 is not necesary to those skilled in the art can provide such apparatus from the foregoing description. SOM generator 24 will, however, be described in more detail with regard to FIG. 3. Prior to that description, however, the operation of the near supervisory interface 10 will now be described.

When the line is idle, i.e., the associated receiver or receivers are all on-hook, lead 25 is grounded and coil K1 is energized. Thus, normally closed contact 29 is grounded and flipflop 20 produces a high Q output indicating the "on-hook" condition. This allows timer 21 to free run periodically clocking in the high output of flipflop 20 into memory 23. As soon as the data representative of the "on hook" condition reaches the output, memory 23 makes available a data ready signal which, SOM generator 24 responds to in the following fashion. The carrier on signal is provided to energize carrier generator 12. The data from memory 23 is read out and an appropriate message is formatted and provided by SOM generator 24 to modulator 11 for transmission over the satellite link 13. Substantially, concurrently, SOM generator 24 produces a clock output which, after traversing delay 30 advances the status of memory 23 so that a new data ready signal is provided representing the status of a new data item for SOM generator 24.

When an associated receiver goes "off hook" relay K1 is deenergized. As a result, a transition appears in the output of flipflop 20. This inhibits timer 21. At the same time, however, pulse generator 22 responds to the transition by producing a clocking signal to memory 23 so that the new "off hook" status of the telephone line is read into the memory. When that data has propagated to the memory output a data ready signal is responded to by SOM generator 24 by reading the data out, initiating the carrier, formatting and transmitting the message to modulator 11 indicative of the new line status, providing a clocking out signal which, after traversing delay 30 further advances the state of memory 23. Of course, the message indicative of the transition from on-hook to off-hook status is uniquely identifiable of that transition.

Typically, after a transition from on-hook to off-hook, dial pulses are received. Each dial pulse can be considered as a pair of transitions, appearing as an "off-hook" to "on-hook" transition followed by a "on-hook"

to "off-hook" transition. In a fashion similar to that previously explained each transition will produce a clocking input signal to clock in the new status to memory 23. This status, when reaching the output of memory 23 will result in the actions previously explained. in similar fashion, after the last of the dial pulses have been transmitted, the line condition will appear "off-hook". At the conclusion of the message, the receiver will again be placed "on-hook" initiating still another, and the last transition in this sequence. The transition will be reflected at the output of flipflop 20, producing a pulse from pulse generator 22 clocking in the last transition to memory 23. This data will be responded to by the SOM generator 24 in the manner previously explained.

The functions of the SOM generator 24 are to, in the presence of the data ready signal, accept the data provided by the memory 23, and in response thereto, to initiate the transmitting stations carrier, format and transmit a message to the modulator and produce a clock out signal for advancing the memory 23. Actually, the start of message comprises at least two distinct portions, each serving a different function. The initial portion of the start of message word comprises a modem preamble which is used for synchronization purposes, and also contains a portion which ahas autocorrelation properties for ambiguity resolution. The last portion of the start of message sequence also has autocorrelation properties which allow its detection in a bit stream with a high rate of probability allowing for a fixed number of bit errors per word. Similarly, the probability of false detection, with a properly designed system is extremely low. Actually, the last portion, i.e., that portion carrying information, may actually be transmitted a number of times and the receiver may employ majority voting techniques to determine proper detection. The same basic bit stream can be employed to indicate either on-hook or off-hook status. That is, the SOM is generated in response to on-hook status. For off-hook status the inverted SOM is generated (i.e., $\overline{SOM}$). Both SOM and inverted SOM correlate to the same value at the receiver, one positive and the other negative. In this fashion the two messages can be distinguished with the same equipment.

Figure 3:
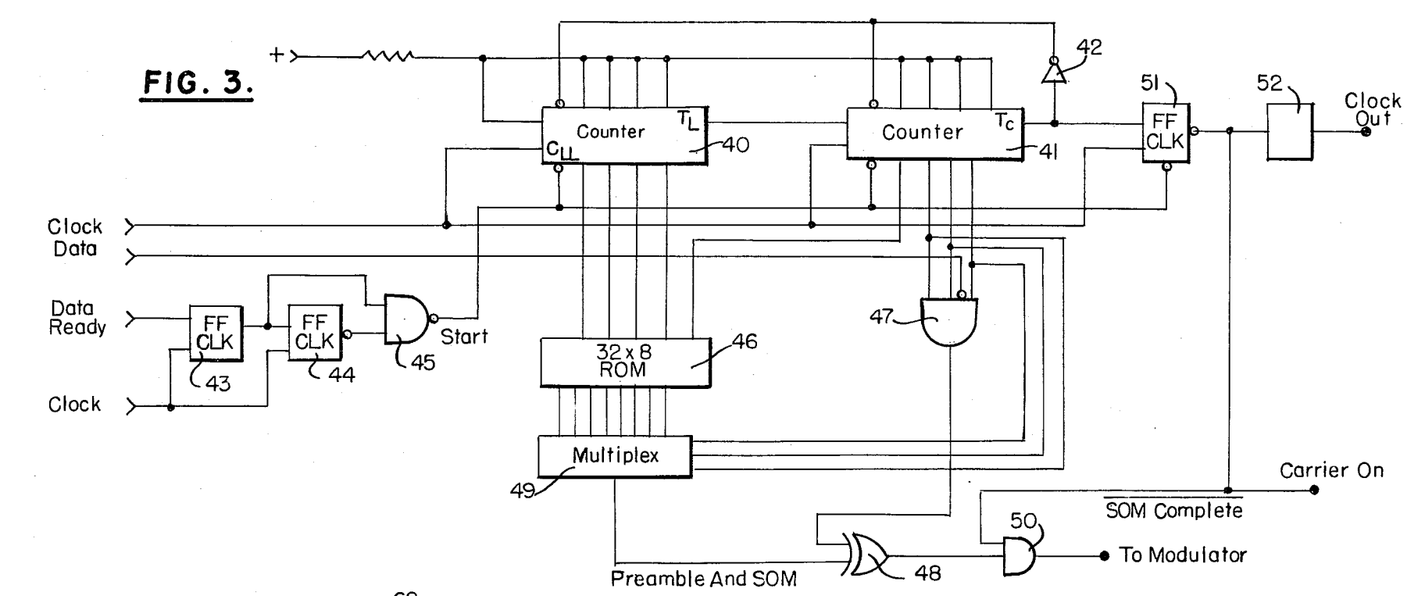
FIG. 3 is a block diagram of a SOM generator 24.

An example of a SOM generator 24 is illustrated, in detail, in FIG. 3. The SOM generator of FIG. 3 includes a pair of four bit counters 40 and 41. The termial count output of a first of the counters, counter 40, is provided as an input to the second counter, counter 41. The terminal count output of counter 41 is fed back through invertor 42 to inhibit both counters 40 and 41. The data ready input, from memory 23 (see FIG. 2) is provided to one input of a flipflop 43. The output of flipflop 43 is provided as an input to another flipflop 44. The Q output of flipflop 43 and the $\overline{Q}$ output of flipflop 44 are provided to NAND gate 45. The flipflops 43, 44 and gate 45 comprise a pulse forming network to generate a sharply defined pulse output of gate 45. The output of gate 45 provides a reset input to counters 40 and 41. Clocking inputs are also provided to flipflops 43 and 44. The outputs of counter 40 and low order output of counter 41 is provided to a read only memory (hereinafter ROM) 46 to read out the information stored therein. The high order three outputs of counter 41 are provided as an input to an AND gate 47. The fourth input to AND gate 47 is provided by the data output of memory 23 (see FIG. 2). The three high order outputs of counter 41 are provided to the multiplexer 49. The output of gate 47 is provided as one input to an exclusive OR gate 48. The outputs of ROM 46 are provided as an input to parallel to serial multiplexer 49. The output of multiplexer 49 provides the other input to exclusive OR gate 48. The output of OR gate 48 is provided as one input to an AND gate 50.

The terminal count output of counter 41 is also provided as an input to a flipflop 51. The $\overline{Q}$ output of flipflop 51 is provided as an input to a one shot 52 whose output is termed CLOCK OUT. The $\overline{Q}$ output of flipflop 51 is termed $\overline{SOM\ COMPLETE}$ and this provided as the second input to AND gate 50. The output of AND gate 50 is provided to modulator 11 for transmission. The CLOCK OUT signal is the input to delay unit 30 (see FIG. 2). Clocking signals are provided to the counters 40 and 41 as well as to flipflop 51.

ROM 46 stores a 256 bit data stream. The outputs of counter 40 and the low order output of counter 41 repeatedly accesses the 32 addresses of the ROM. The three high order bits of counter 41 multiplex the eight outputs of the ROM. The result is a serial bit stream output of multiplexer 49 comprising, in serial fashion the preamble portion of the message, followed by the SOM word, which may be repeated a number of times for instance. When the three high order outputs of counter 41 are all logic "1" the multiplexer outputs the SOM word. And, denpending upon the length of the SOM word, it may be repetitively transmitted.

In operation SOM generator 24 is initiated by a data ready output from memory 23. Flipflops 43, 44 and gate 45 form a pulse which resets counter 40, 41 and flipflop 51. When reset the high $\overline{Q}$ output of flipflop 51 ($\overline{SOM\ COMPLETE}$) energizes the carrier generator to provide the carrier signal to modulator 11. When reset the counters 40 and 41 begin counting from zero in response to their clocking inputs. This cycles ROM 46 and, multiplexer 49 produces a serial bit stream output as controlled by the high order outputs of counter 41.

If the data ready signal which initiated the operation was accompanied by a "on-hook" indication, i.e., the Q output of flipflop 20 (see FIG. 2) which stored this data item was high, the data output of the memory 23 is correspondingly high, and provides a low input to gate 47 due to the inverting input. The result will be a low output of gate 47. With this low output, coupled as one input to exclusive OR gate 48, the output of exclusive OR gate 48 will correspond to its other input, i.e., the bit stream provided by multiplexer 49. On the other hand, if the data item has corresponded to an "off-hook" condition, the output of AND gate 47 would be high causing the output of exclusive OR gate 48 to be the inverted replica of the output of of multiplexer 49.

At the conclusion of the transmission of the bit stream, the counter 41 records a terminal count, inhibiting counters 40 and 41. This also sets flipflop 51. As a result, the $\overline{Q}$ output goes low, deenergizing the carrier generator. This same transition operates one shot 52 to provide the CLOCK OUT to delay unit 30 (see FIG. 2). After traversing the delay unit 30, this signal clocks the output stage of the memory completing the cycle. At this point, the apparatus is ready to process the next hook switch transition input.

In summary, in the on-hook condition inputs are provided to memory 23 (see FIG. 2) at a rate determined by timer 21, whose output produces the clock input to the memory 23. As these data items reach the memory output a data ready signal is generated which initializes the SOM generator 24. SOM generator 24 turns on the carrier, and outputs, to the modulator, a data stream comprising a modem preamble and a SOM word, in true form. At the conclusion of the bit stream to the modulator, the carrier is turned off and the memory 23 is clocked to make available to SOM generator 24 the next data item. This operation continues, at a rate which is essentially determined by the rate of timer 21 until an off-hook condition is detected. Immediately, on detection of the off-hook condition, a data item is inputed to the memory 23. When this data progresses to the output it will again initiate operation of SOM generator 24. This will again turn the carrier on and provide a bit stream consisting of the modem preamble. Now, however, by virtue of the "off-hook" status the SOM word is sent in inverted form. Each subsequent line state transition, corresponding to half of a dial pulse initiates a similar message. Whether or not the SOM word is sent in true or inverted form depends upon the line state at the conclusion of the associated transition. In this mode of operation the rate at which messages are sent is determined by the delay imposed to the CLOCK OUT signal by delay unit 30. In this fashion, the supervisory interface retimes the dial pulse rate. The capacity of memory 23 is selected so that no data is lost even though the input dial pulse rate is greater than the output rate. A typical message is illustrated in FIG. 5A.

Figure 4:
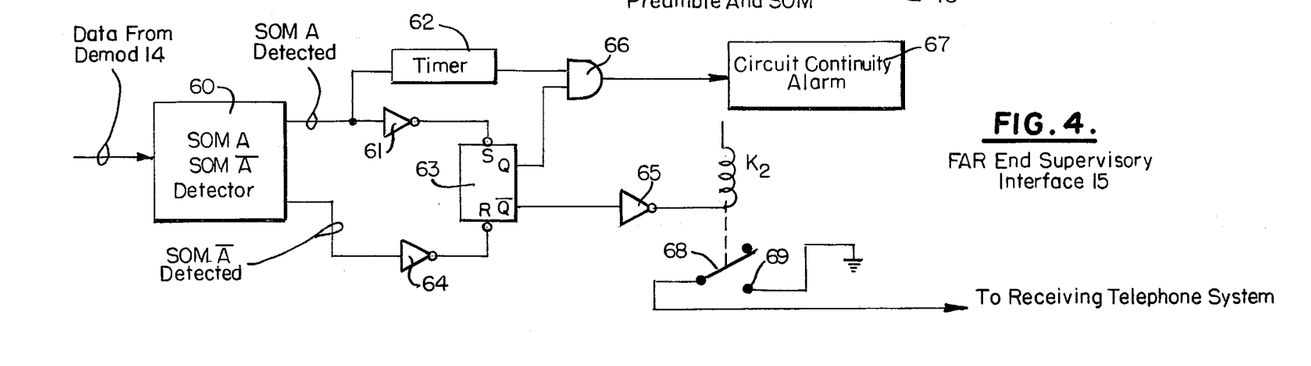
FIG. 4 is a block diagram of a far supervisory interface.

The transmission of the messages formatted by the supervisory interface 10, its relay by satellite relay 13 and reception at the receiving terminal are matters well within the skill of the art and need not be described in detail here. The output of demodulator 14 comprises either an SOM or an $\overline{SOM}$ i.e., the message as transmitted, with the preamble stripped therefrom. As shown in FIG. 4 this pulse stream is provided to detector 60 to detect whether SOM or $\overline{SOM}$ has been detected. Detector 60 provides an output, when SOM is detected to an invertor 61 and a timer 62. The output of invertor 61 is connected to the set input of a flipflop 63. The output of the timer 62 is provided as one input to an AND gate 66, whose other input is provided by the Q output of flipflop 63. The $\overline{SOM}$ output of detector 60 is provided as an input to an invertor 64, whose output is provided as the reset input to flipflop 63. The $\overline{Q}$ output of flipflop 63 is provided to an invertor 65 whose output is connected to relay coil K2. The contact of relay coil K2, contact 68, is grounded when the relay coil is de-energized. Contact 68 provides a signal to the receiving telephone system indicating either off-hook status or dial pulse information by being grounded.

When SOM is detected flipflop 63 is set providing a high input to AND gate 66. Detection of SOM also resets timer 62. Timer 62 is reset to time a period equal to or slightly longer than that of timer 21 (see FIG. 2). If the delay between one SOM and the next (when the subscriber is on-hook) is greater than the period of timer 62, its expiration provides a second high input to AND gate 66, whose output energizes the circuit continuity alarm 67.

Detector 60 may comprise a unique word detector such as that disclosed by Schrempp et al "Unique Word Detection in Digital Burst Communications" appearing in *IEEE Transactions on Communications Technology,* Vol. Com-16, Aug. 1968, p. 579–605, or other conventional apparatus.

In the above described apparatus, as illustrated in FIGS. 1–4, a message is formatted and transmitted for each line state transition which may result from the line going from on-hook to off-hook, off-hook to on-hook, or the equivalent transition which occurs twice for each dial pulse. A modification of the foregoing apparatus, to be described below, allows a single transmitted burst to be formatted and transmitted for each dialed digit, or each line state transition which is not accompanied by dial pulses. Since on the average, a dialed digit corresponds to five, which comprises ten line state transitions, the modification to be described reduces the number of messages by approximately a factor of ten.

Figure 6:
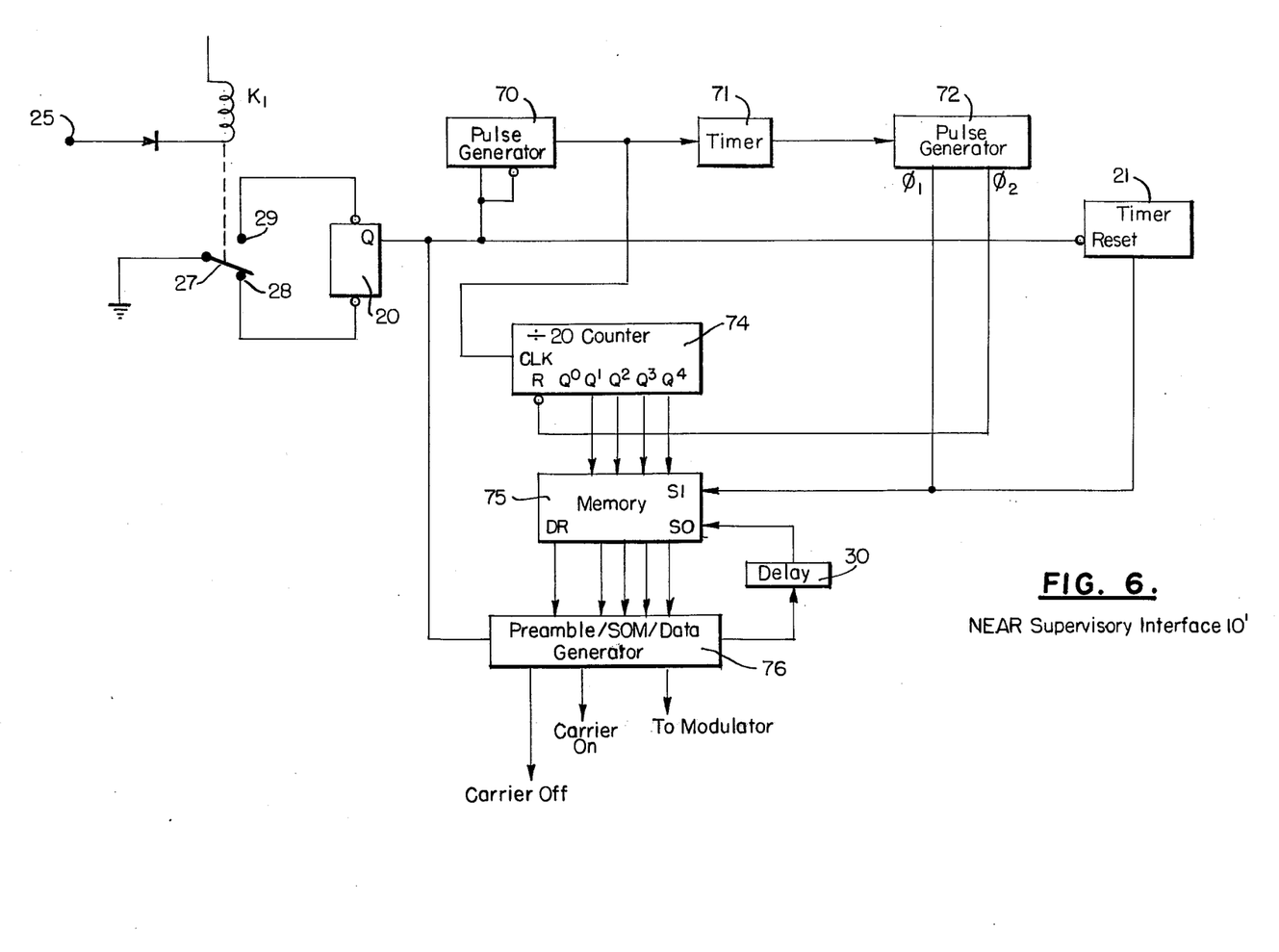
FIG. 6 is a block diagram of a modified near supervisory interface.

In the modified system transmitted bursts include a modem preamble and an SOM (or $\overline{SOM}$), depending upon the fianl state of the line after the transitions cease, and a four bit binary character representing the number (if any) of dial pulses which occur. Although both the SOM and the four bit binary code can be repeated to improve error immunity, we refer below only to the repetition in the four bit binary code, repetition of SOM ($\overline{SOM}$) will be understood. FIG. 5B illustrates the message format for this system. The block diagram of FIG. 1 is still applicable although the near supervisory interface 10 and far supervisory interfaces 15 are modified. FIG. 6 illustrates the modified near supervisory interface 10'. The telephone connection to the transmitting telephone system is made at contact 25 which is connected to the anode of a diode 26 whose cathode is connected to one terminal of relay coil K1, similar to that shown in FIG. 2. The relay contact 27 is grounded and, depending upon the energization state of relay K1, it eiter grounds terminals 28 or 29 which are respectively connected to reset and set inputs of a flipflop 20. The Q output of flipflop 20 is provided to th reset input of the timer 21 as well as to a pulse generator 70 and the preamble/SOM/data generator 76. The output of the pulse generator 70 is provided to a timer 71 and also comprises the clocking input to a divide by 20 counter 74. The output of timer 71 is provided as an input to pulse generator 72 which has two outputs, $\phi 1$ and $\phi 2$. The first output, $\phi 1$ is connected as the shift input signal of memory 75 and $\phi 2$ is the resetting input for divide by 20 counter 74. The output of timer 21 is also connected to the shift input of memory 75. The high order four bits of the divide by 20 counter 74 provide the data input to memory 75. Memory 75 provides a data ready output as well as four bits of data to the preamble/SOM/data generator 76. The clock output of preamble/SOM/data generator 76 is connected, through delay unit 30 to the shift out terminal of memory 75. Finally, the generator 76 provides the carrier on and multiplexer signals, connected to the apparatus shown in FIG. 1.

This apparatus provides continuity testing by generating periodic SOM messages when the line is in the on-hook condition, controlled by the period of timer 21, similar to the operation of FIG. 2. That is, when the line is in the on-hook state timer 21 periodically times out and provides a shift input to memory 75. The counter 74 is normally reset and the all zero input is provided to the memory 75. This memory 75 is similar to the memory 23 in that it is a first in and first out memory. When the input data reaches the output a data ready signal is provided to generator 76 which generates an SOM message, in a manner similar to that employed in FIG. 2, for continuity checking. The modified near supervisory interface is slightly different from that illustrated in FIG. 2 in that the line status condition is directly applied to generator 76 rather than being propagated through the memory 75. If memory propagation time is short (such as 100 $\mu$ sec) the line status will not change between the memory input and readout. If memory propagation times are considered in which line status changes can occur then line status can also propagate through the memory, in addition to dial pulses information. Thus, periodically generator 76 formats and provides to multiplexer 17 SOM message indicating the on-hook status of the line.

When the line status changes to off-hook, pulse generator 70 is enabled to start running of timer 71. At the same time, the counter 74 is clocked, by the output of pulse generator 70. The period of timer 71 is selected to encompass all the line state transitions generated as a result of dialing a single digit. Generally, this can be implemented with a triggerable timer to time a period slightly longer than the period between dial pulse transitions. With this arrangement timer 71 expires shortly after the last transition of any single digit. Each transition is reflected by the changing state of the output of flipflop 20 which produces a pulse output of pulse generator 70 and thus increments the count in counter 74. When timer 71 times out, the count stored in the counter 74 will equal the value of the dialed digit, if any was associated with the first line state transition, within the period of timer 71. At the expiration of the period timed by timer 71, a signal is provided to pulse generator 72 which produces two time displaced pulses, $\phi 1$ and $\phi 2$. The first of these pulses, $\phi 1$ is provided to the shift input of memory 75 causing the contents of counter 74 to be shifted into the memory. The second pulse produced by pulse generator 72, in response to the expiration of timer 71, is $\phi 2$ which resets the counter 74. The counter 74 is now in condition to begin counting up the line state transitions associated with the next dialed digit.

When a data entered into memory 74 propagates to its output the data ready signal will be provided to generator 76. Upon reception of the data ready signal generator 76 will turn on the carrier and begin outputting the message to multiplexer 17 corresponding to a modem preamble, an SOM word or words (or an inverted SOM word or words) corresponding to the status of the line and generator 76 will append to that message the data made available by the memory 75, corresponding to the dialed digit. At the conclusion of this process generator 76 provides a CLOCK OUT signal to delay 30. After this signal traverses the delay 30 it will provide a shift out signal for memory 75 clocking out the transmitted data and making available any new data to generator 76 to repeat the cycle of operation.

It will be apparent, therefore, that the near supervisory interface 10' performs a number of functions:

A. periodically transmitting a message including SOM when the line status is on-hook and no dialed pulses are detected;

B. formatting and transmitting a message including $\overline{SOM}$ when the line status is off-hook and no dialed digit pulses are detected.

C. formatting and transmitting a message including $\overline{SOM}$ followed by a binary number representing the dialed digit associated with that line status.

Figure 7:
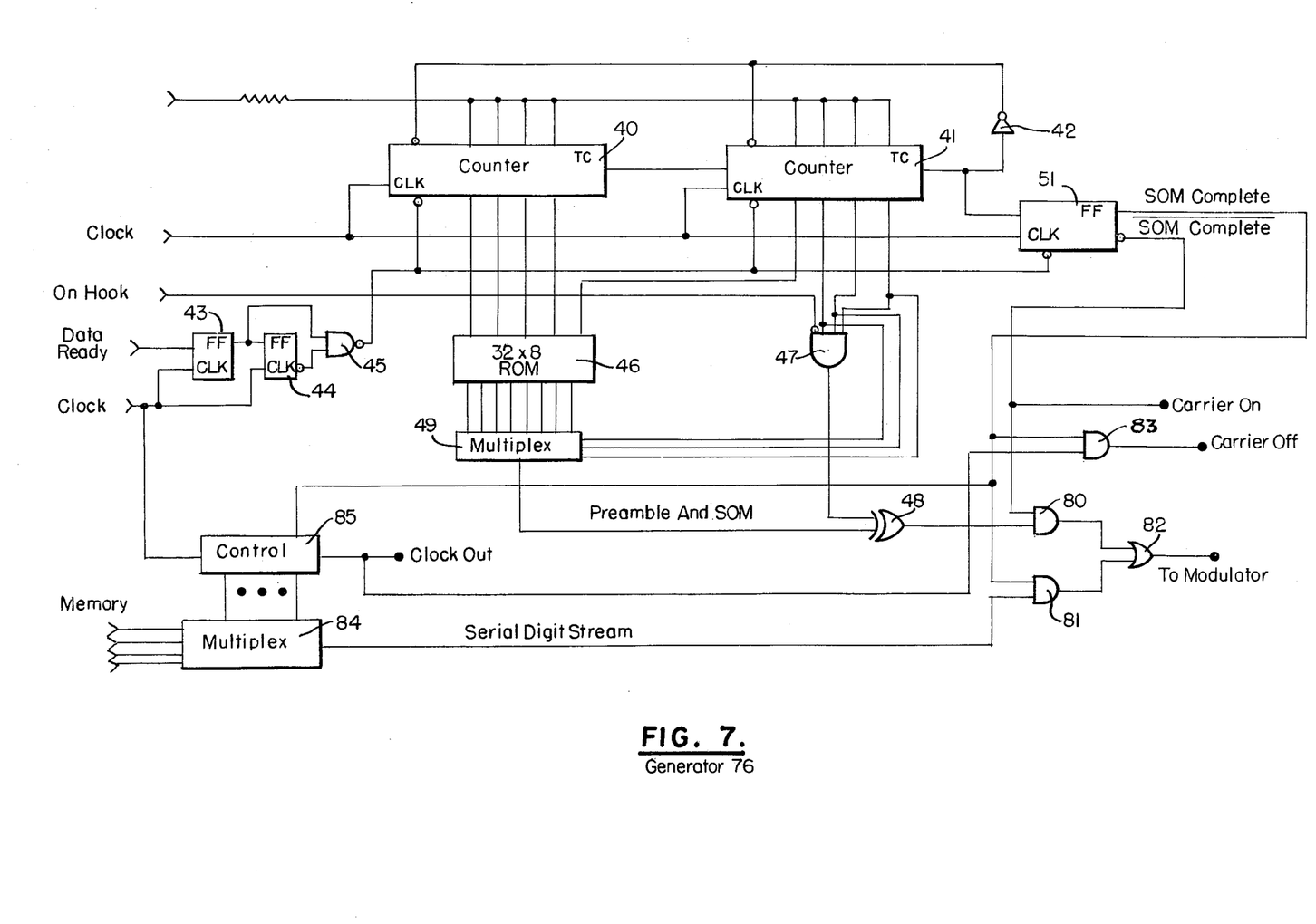
FIG. 7 is a block diagram of modified generator 76.

To see in more detail how the generator 76 performs these functions, with the information provided to it as illustrated in FIG. 6, we now refer to FIG. 7 which illustrates the generator 76 in more detail.

FIG. 7 is similar to FIG. 3 which illustrates the SOM generator 24. In addition to the apparatus illustrated in FIG. 3, FIG. 7 illustrates that the four bit memory output is coupled, through a multiplexer 84 to an AND gate 81. The other input to AND gate 81 is provided by the signal SOM COMPLETE, from flipflop 51. Multiplexer 84 multiplexes the four bit binary number indicating the dialed digit to a serial digit stream under the control of control 85. Control 85 can be designed to repeat the digit any number of times, for example, five repetitions have been selected. Thus, the control 85 allows each bit output of the memory 75 to be coupled through to AND gate 81 in serial order, and repeats this five times. Control 85 is initiated into operation by the signal SOM COMPLETE and, at the conclusion of the process produces CLOCK OUT which is provided to the delay 30 (see FIG. 6). In addition, the signal CLOCK OUT provides an input to an AND gate 83 whose other input is provided by the signal SOM COMPLETE, to produce the carrier off signal to turn off the carrier. The carrier on signal is produced by $\overline{SOM}$ COMPLETE as in FIG. 4. The output to multiplexer 17, instead of being provided by AND gate 50, is coupled through an OR gate 82. OR gate 82 has two inputs, one from AND gate 80 (which corresponds to AND gate 50 in FIG. 4). transmitting the preamble and SOM bits. The other input to OR gate 82 is from AND gate 81 which provides the serial digit stream. Just as in FIG. 4 the line status, whether on-hook or off-hook, determines whether or not the SOM portion of the message is sent in true or inverted form. This is implemented by AND gate 47 providing an input to exclusive OR gate 48. Inasmuch as the operation of the apparatus illustrated in FIG. 7 is in all other respects similar to that shown in FIG. 4, no further discussion of this apparatus is deemed necessary.

Figure 8:
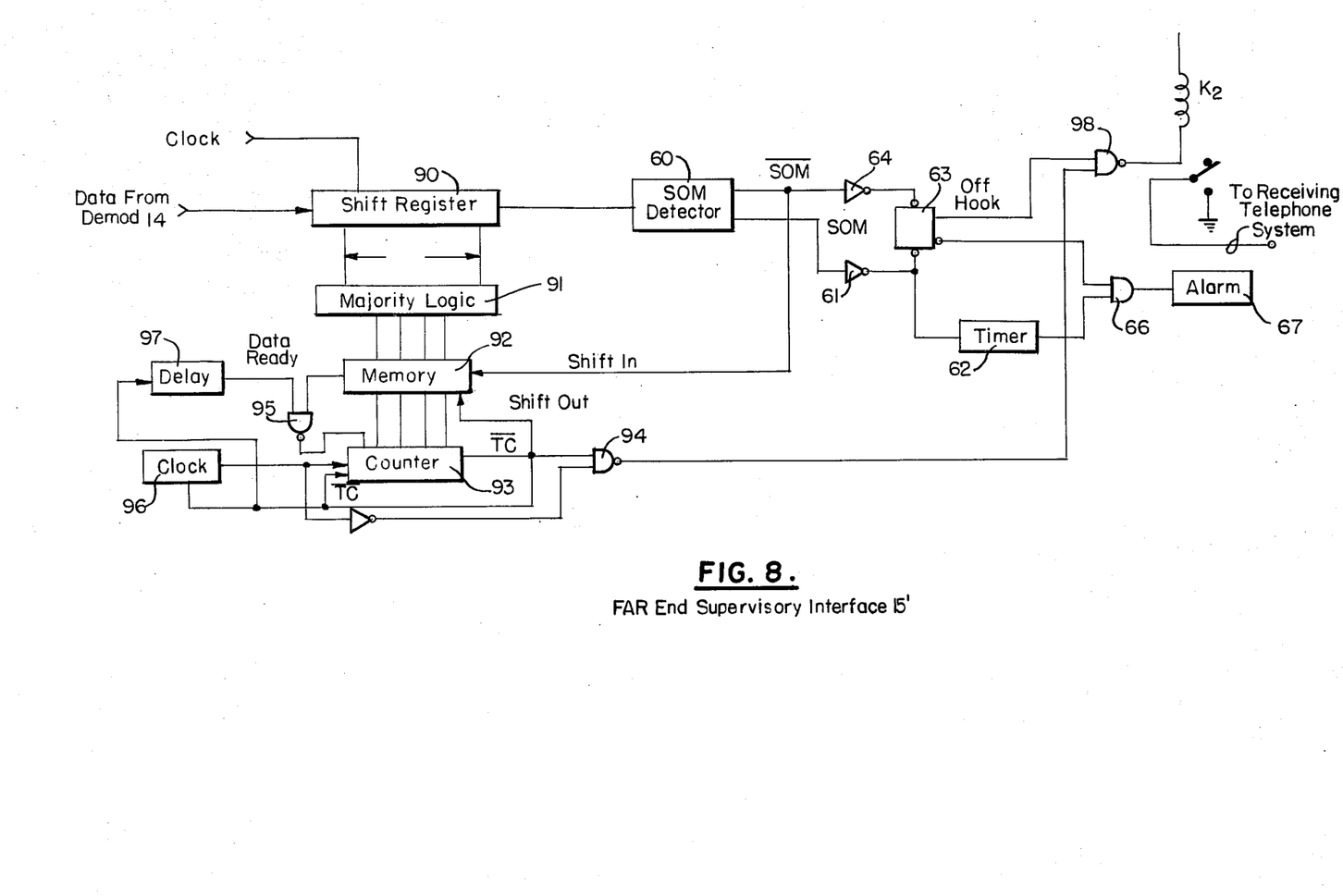
FIG. 8 is a block diagram of a modified far supervisory interface.

At the receiving terminal, the modified far end supervisory interface 15' is illustrated in FIG. 8.

FIG. 8 shows many items of the apparatus which are identified to FIG. 4, and connected in much the same fashion. Thus the SOM detector 60 provides an output to the set and reset inputs of a latch 63 through invertors 61 and 64, respectively. The SOM output of the detector also initiates a timer 62 whose output is connected through AND gate 66 to an alarm 67. The other input to AND gate 66 is provided by the $\overline{Q}$ output of the latch 63. Thus, in the on-hook condition, which corresponds to SOM, repeated receptions are required, within the period measured by timer 62, to prevent the alarm 67 from becoming energized. The remaining apparatus in FIG. 8 is provided to translate the dial digit information transmitted along with the $\overline{SOM}$ word into contact closures for operation with the receiving telephone systems. To effect this, data from demodulator 14 is fed through a shift register 90. The length of shift register 90 is designed to equal the length of the digit stream appended to the SOM message. Thus, in the example previously referred to, if each dialed digit is represented by four bits, and the dialed digit is repeated five times, shift register 90 would accommodate twenty bits. Each of the outputs of shift register 90 is provided to a majority logic array 91. In the majority logic array 91 each corresponding bit is provided to a majority logic voting unit to determine the condition of that bit on a majority basis. In the example we are referring to, each bit is repeated five times and thus a vote of there out of five is required to determine the status of each bit. As a result, there are four outputs from majority logic array 91, corresponding to each bit in the four bit number representing the dial digit. These four bits are made available to memory 92 which is a first in-first out memory and accepts a shift in signal corresponding to $\overline{SOM}$ from SOM detector 60. Memory 92 provides two outputs, a data ready output provided to a gate 95 and the four data bits corresponding to the input data. The four data bits are provided to a count down counter 93. The counter 93 is counted down by clocking signals from clock 96 which is inhibited when the counter 93 reaches its terminal count. The output of gate 95 allows the data stored in the output memory stage of memory 92 to be loaded into the counter 93. In operation, after counter 93 is loaded with the binary coded quantity equivalent a decimal dial digit, pulses from clock 96 count the counter down providing an output to gate 94 for each pulse which passes the counter. When the counter reaches terminal count the clock 96 is inhibited. The output of counter 93 is anded with the output of the clock in gate 94 and the output of gate 94 is provided as an input to gate 98. The other input to gate 98 is the off-hook output from latch 63. Of course, during the reception of dial digit pules line status will be off-hook and thus these pulses will pass gate 98 and pulse relay K2, once for each count initially stored in the counter. Relay K2 therefore translates pulses into contact closures for use with the receiving telephone system. In order to limit the rate at which pulses corresponding to one dial digit follow pulses corresponding to a different dial digit delay 97 is provided between terminal count (TC) output of counter 93 and the input to gate 95. The terminal count output of counter 93 also provides the shift out signal to memory 92 to shift a new data word into its output position.

In one preferred embodiment, the transmission of dial digit transitions is limited by the delay 30. Of course, changing the extent of this delay serves to vary the transmission rate of these transitions. Although this limiting action occurs at the transmitting terminal, since the delay 30 is located there, those skilled in the art will understand that this limiting action may also take place at the receiving terminal. This can be implemented (in FIG. 4) by interposing a memory between the output of latch 63 and coil K2 with a delay initiated by one output of the memory serving to advance the memory. This is not preferred for it requires an additional memory at the receiving terminal which is not otherwise required.

In FIG. 8, on the other hand, delay 97 limits the rate at which different dialed digits can be decoded an frequency of clock 96 determines the period between different transitions representative of a single dialed digit. In some circumstances, employing the apparatus of FIG, 8, the delay 30 (of FIGS. 2 and 6) may be omitted.

Although we have illustrated the inventive apparatus cooperating with a conventional telephone system employing DC signaling, those skilled in the art will readily preceive that or inventive apparatus could, just as well, cooperate with a conventional telephone system employing tone frequency signaling. Such conversion would only require adding a tuned circuit to detect presence of the signaling tone.

We claim:

1. In band supervisory and signaling interface for a single channel per carrier communication system including at least a pair of geographically separated stations communicating through a single communication link including a single modulator-demodulator pair coupled through a remote relay comprising, at a one of said stations, a terminal for connection to a conventional telephone line, detecting means connected to said terminal for detecting on-hook or off-hook status of said line, timing means responsive to said detecting means for producing a timing signal at the termination of a timing period in which said line status remains on-hook, first means connected to said timing means and to said detecting means for producing a unique signal in response to said timing means indicative of line status, the output of said first means coupled to said modulator for transmission of said unique signal.

2. The apparatus of claim 1 wherein said other station includes, second detecting means, connected to said demodulator, for detecting said unique signal, second timing means having a second timing period, reset by the output of said second detecting means corresponding to the detection of said unique signal, and alarm means connected to said second timing means and to said detecting means for indicating a failure condition when said second timer expires.

3. The apparatus of claim 1 in which said second timing period is equal to or greater than said timing period.

4. The apparatus of claim 1 in which said first means includes, first in-first out memory means responsive to said detecting means and to said timing means storing data identifying line status at times corresponding to said timing signal, said memory means including an output stage for making said stored data available and a data ready signal producing means for signifying that said stored data is available.

5. The apparatus of claim 4 in which said first means further includes, word generator means connected to said output stage of said memory means for producing said unique signal in response to said data ready signal, said word generator means coupled to said modulator for transmitting said unique signal.

6. The apparatus of claim 5 in which said word generator means includes a ROM storing a representation of said unique signal, and means for accessing said ROM to read out said unique signal.

7. The apparatus of claim 5 in which said word generator means produces an ending signal at the conclusion of said unique signal, delay means coupling said ending signal to said first infirst out memory means for shifting out of said memory means data stored in said output stage and shifting previously stored data into said output stage.

8. The apparatus of claim 1 in which said first station further includes pulse generator means connected to said detecting means for producing a substitute timing signal in response to detection of line status changes by said detecting means, said substitute timing signal coupled to said first means, whereby said first means responds to said detecting means upon the production of a timing signal or a substitute timing signal.

9. The apparatus of claim 8 in which said first means includes, memory means coupled to said detecting means and responsive to said timing signal and to said substitute timing signal for storing data definitive of line status at times corresponding to said timing signal and said substitute timing signal.

10. The apparatus of claim 9 wherein said memory means is a first in-first out memory including an output stage for making data available and a device for producing a data ready signal when such data is available at said output stage.

11. The apparatus of claim 10 in which said first means includes a word generator for producing said unique signal and the inversion of said unique signal,
means coupling said output stage of said memory means and said data ready signal to said word generator means,
whereby said word generator means couples said unique signal or the inverse of said unique signal to said modulating means for transmission.

12. The apparatus of claim 11 in which said word generator means further includes means for producing an ending signal in response to the completion of said unique signal or the inverse of said unique signal,
delay means coupling said ending signal to said memory means for shifting out of said memory means data stored in said output stage and shifting previously stored data into said output stage.

13. The apparatus of claim 1 which further includes a pulse generator responsive to the output of said detecting means for producing a substitute timing signal in response to off-hook status of said line,
the output of said pulse generator means connected to said first means for producing the inverse of said unique signal at times corresponding to said substitue timing signal when said detecting means indicates off-hook status of said line, and for producing said unique signal at times corresponding to production of said substitute timing signal when said detecting means indicates on-hook status of said line.

14. The apparatus of claim 13 wherein said first means includes,
a first in-first out memory coupled to the output of sid detecting means having a clocking input coupled to the output of said pulse generator means and to said timing means, said memory including an output stage for making data available and means for producing a data ready signal when such data is available,
a word generator coupled to the output of said memory and responsive to said data ready signal for producing either said unique signal or the inverse thereof in response to the data stored in said memory.

15. The apparatus of claim 14 wherein said word generator produces an ending signal at the conclusion of said unique signal or the inverse thereof, delay means coupling said ending means signal to said memory for shifting data out of the output stage of said memory and shifting therein previously stored data.

16. The apparatus of claim 15 wherein said second station includes,
means or detecting said unique signal, or the inverse thereof,
second timing means responsive to the detection of said unique signa,
alarm means connected to said second timing means and to said detecting means for indicating a failure condition when said second timing means expires.

17. The apparatus of claim 16 wherein said second station further includes contact means respnsive to detection of the inverse of said unique signal for grounding.

18. The apparatus of claim 3 in which said first means includes,
memory means responsive to said detecting means for storing, as a single data item, the number of line status transitions corresponding to an entire dialed digit, said memory means including an output stage for making said stored data available and a data ready signal producing means for signifiying that said stored data is available,
word generator means connected to said output stage and to said detecting means for producing said unique signal in response to said data ready signal when the line is on-hook and for producing an inverted replica of said unique signal when the line is off-hook and for appending to said inverted unique signal data from said memory means.

19. The apparatus of claim 18 in which said word generator means produces an ending signal at the conclusion of a message,
delay means coupling said ending signal to said memory means for shifting out of said memory means data stored in said output stage and for shifting previously stored data into said output stage.

20. The apparatus of claim 18 wherein said second station includes,
second means, connected to a receiving telephone line, responsive to transmissions of data from said memory means for converting said data into the equivalent number of line status transitions.

21. The apparatus of claim 18 which includes parallel to serial multiplexer for coupling said memory means to said modulator,
control means controlling said multiplexer to repeat said data a plurality of times.

22. The apparatus of claim 21 wherein said second station includes,
second means, connected to a receiving telephone line, responsive to transmissions of data from said memory means for converting said data into the equivalent number of line status transitions.

23. The apparatus of claim 22 where said second means includes majority voting means producing a data output corresponding to the condition in which a majority of said plurality of data are received.

* * * * *